(12) United States Patent
Vojnović et al.

(10) Patent No.: US 8,478,762 B2
(45) Date of Patent: Jul. 2, 2013

(54) RANKING SYSTEM

(75) Inventors: Milan Vojnović, Cambridge (GB);
Dinkar Vasudevan, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 224 days.

(21) Appl. No.: 12/434,329

(22) Filed: May 1, 2009

(65) Prior Publication Data

US 2010/0281033 A1    Nov. 4, 2010

(51) Int. Cl.
*G06F 7/38* (2006.01)

(52) U.S. Cl.
USPC ........................................................ 707/748

(58) Field of Classification Search
USPC ........................................................ 707/748
See application file for complete search history.

(56) References Cited

U.S. PATENT DOCUMENTS

| | | | |
|---|---|---|---|
| 6,278,989 B1 * | 8/2001 | Chaudhuri et al. | 1/1 |
| 6,718,224 B2 * | 4/2004 | Firth et al. | 700/121 |
| 7,383,262 B2 | 6/2008 | Das et al. | |
| 2006/0212429 A1 | 9/2006 | Bruno et al. | |
| 2006/0247547 A1 * | 11/2006 | Sarkar et al. | 600/515 |
| 2008/0059125 A1 | 3/2008 | Fraser et al. | |
| 2008/0059540 A1 | 3/2008 | Brown et al. | |
| 2009/0018985 A1 * | 1/2009 | Zhang et al. | 706/20 |
| 2009/0043714 A1 | 2/2009 | Zhao et al. | |
| 2009/0063134 A1 * | 3/2009 | Gallagher et al. | 704/10 |
| 2010/0169360 A1 * | 7/2010 | Cohen et al. | 707/769 |

FOREIGN PATENT DOCUMENTS

WO    WO0196861 A1    12/2001

OTHER PUBLICATIONS

Branke, "Selecting a Selection Procedure", Sep. 2005, Management Science, pp. 1-20.*
Nadav, "Processing Top-k Queries from Samples", Feb. 2007, Tel-Aviv University, pp. 1-50.*
Berger, "Statistical Decision Theory and Bayesian Analysis", Springer, Second Edition, 1985, pp. 223-226.
Charikar, et al., "Finding Frequent Items in Data Streams", retrieved on Mar. 3, 2009 at <<http://www.cs.rutgers.edu/~farach/pubs/FrequentStream.pdf>>, 11 pages.

(Continued)

*Primary Examiner* — James Trujillo
*Assistant Examiner* — Soheila Davanlou
(74) *Attorney, Agent, or Firm* — Zete Law, P.L.L.C.; MacLane C. Key

(57) ABSTRACT

Ranking systems are described. In an embodiment a large scale data center has peta bytes of items and a query engine is provided to find the top k most frequently occurring items. In embodiments, samples are taken from the data center at least until a specified number of samplings is met, or until a stopping rule is met. In examples, the samples form a sample sketch which is used to find the top k most frequently occurring items without the need to examine every item in the data center. In other examples, the number of samplings or stopping rule is varied to provide ranks or frequencies. In other embodiments the ranking system operates on items having values to find separators which divide the items into bins such that the proportion of the items in each bin is different. For example, a data set may be apportioned to different types of processor.

15 Claims, 12 Drawing Sheets

OTHER PUBLICATIONS

Chaudhuri, et al., "Random Sampling for Histogram Construction: How much is enough?", retrieved on Mar. 3, 2009 at <<http://citeseerx.ist.psu.edu/viewdoc/summary?doi=10.1.1.53.1734>>, 12 pages.

Cohen, "Processing Top-k Queries from Samples", retrieved on Mar. 3, 2009 at <<http://www.math.tau.ac.il/~haimk/papers/topk.pdf>>, May 7, 2008, pp. 1-29.

Cormode, et al., "An Improved Data Stream Summary: The Count-Min Sketch and its Applications", retrieved on Mar. 3, 2009 at <<http://dimacs.rutgers.edu/~graham/pubs/papers/cm-full.pdf>>, Elsevier Science, Dec. 16, 2003, pp. 1-18.

Csiszar, "The Method of Types", retrieved on Mar. 3, 2009 at <<http://ieeexplore.ieee.org/stamp/stamp.jsp?arnumber=00720546>>, IEEE Transactions on Information Theory, vol. 44, No. 6, Oct. 1998, pp. 2505-2523.

Dembo, et al., "Large Deviations Techniques and Applications", Second Edition, Springer, pp. 20-25.

"Elements of Information Theory", retrieved on Mar. 3, 2009 at <<www.cs.purdue.edu/homes/spa/papers/chap6.ps>>, pp. 1-53.

Flajolet, et al., "Probabilistic Counting", retrieved on Mar. 3, 2009 at <<http://ieeexplore.ieee.org/stamp/stamp.jsp?tp=&arnumber=4568063&isnumber=4568049>>, IEEE, 1983, pp. 76-82.

Gibbons, et al., "New Sampling-Based Summary Statistics for Improving Approximate Query Answers", retrieved on Mar. 3, 2009 at <<http://theory.stanford.edu/~matias/papers/sigmod98a.pdf>>, 12 pages.

Golab, et al., "Identifying Frequent Items in Sliding Windows over On-Line Packet Streams", retrieved on Mar. 3, 2009 at <<http://www.imconf.net/imc-2003/papers/p318-golab.pdf>>, IMC, 2003, 6 pages.

Gopalakrishnan, et al., "Ranking Search Results in P2P Systems", retrieved on Mar. 3, 2009 at <<www.cs.umd.edu/~gvijay/Academics/papers/terra/tech-report/CS-TR-4779.ps>>, pp. 1-20.

Greenwald, et al., "Space-Efficient Online Computation of Quantile Summaries", retrieved on Mar. 3, 2009 at <<http://citeseerx.ist.psu.edu/viewdoc/summary?doi=10.1.1.7.8618>>, 9 pages.

Guha, et al., "Approximate Quantiles and the Order of the Stream", retrieved on Mar. 3, 2009 at <<http://www.cis.upenn.edu/~sudipto/mypapers/order.pdf>>, PODS, 2006, 7 pages.

Guha, et al., "Space-Efficient Sampling", retrieved on Mar. 3, 2009 at <<http://jmlr.csail.mit.edu/proceedings/papers/v2/guha07a/guha07a.pdf>>, 8 pages.

Hoeffding, "Probability Inequalities for Sums of Bounded Random Variables", retrieved on Mar. 3, 2009 at <<http://www.jstor.org/stable/2282952>>, Journal of the American Statistical Association, vol. 58, No. 301, Mar. 1963, pp. 13-30.

Hua, et al., "Efficiently Answering Top-k Typicality Queries on Large Databases", retrieved on Mar. 3, 2009 at <<http://www.cs.sfu.ca/~jpei/publications/typicality-vldb07.pdf>>, VLDB, 2007, 12 pages.

Konig, "Large Deviations, Techniques and Applications", retrieved on Mar. 3, 2009 at <<http://www.math.uni-leipzig.de/~koenig/www/GAEngSS06.pdf>>, Announcement Summer Term 2006, Lecture/Student's Seminar, 2006, 1 page.

Kuhn, et al., "Distributed Computation of the Mode", retrieved on Mar. 3, 2009 at <<http://www.dcg.ethz.ch/publications/podc08.pdf>>, PODC, 2008, 10 pages.

Manku, et al., "Approximate Frequency Counts over Data Streams", retrieved on Mar. 3, 2009 at <<http://infolab.stanford.edu/~manku/papers/02vldb-freq.pdf>>, Proceedings of the 28th VLDB Conference, 2002, 12 pages.

Manku, et al., "Random Sampling Techniques for Space Efficient Online Computation of Order Statistics of Large Datasets", retrieved on Mar. 3, 2009 at <<http://infolab.stanford.edu/~manku/papers/99sigmod-unknown.pdf>>, 12 pages.

Sarma, et al., "Estimating PageRank on Graph Streams", retrieved on Mar. 3, 2009 at <<http://www.cc.gatech.edu/~atish/papers/pagerank-pods08.pdf>>, ACM PODS, 2008, 10 pages.

Vasudevan, et al., Ranking through Random Sampling, Technical Report, MSR-TR-2009-8, Microsoft Research, Jan. 2009, title page and pp. 1-13.

Vitter, "Random Sampling with a Reservoir", retrieved on Mar. 3, 2009 at <<http://www.cs.umd.edu/~samir/498/vitter.pdf>>, ACM Transactions on Mathematical Software, vol. 11, No. 1, Brown University, ACM, Mar. 1985, pp. 37-57.

Yossef, et al., "Random Sampling from a Search Engine's Index", retrieved on Mar. 3, 2009 at <<http://tx.technion.ac.il/~gmax/papers/se.www2006.pdf>>, VWW, 2006, 10 pages.

* cited by examiner

RANKING SYSTEM

BACKGROUND

In many applications it is required to rank items in a data set. For example, the data set may comprise categories of sensor readings taken from a mechanical apparatus which it is required to control. It is often required to find a "hot list" of data items, for example, the top 5 most frequently occurring items. This information may then be fed back to the control system which is controlling the mechanical apparatus. In order to find such a "hot list" the entire data set must be gone through which is often practically infeasible where the data set is very large (e.g. Peta bytes) or is a continuous data stream.

The scale of data held in data centers or databases often reaches an enormous scale and it is important to be able to efficiently query such large scale data sets with respect to space and time. Time efficient computation is crucial for fast resolving of queries and this is also crucial for energy savings.

In cases where the items in the data set have values associated with them it may be desired to find the distribution of values across all the items. For example, the values may be sensor readings taken from a manufacturing plant which it is required to control. If a control system controlling the plant needs to carry out fine scale processing for a particular range of sensor reading values and coarse scale processing for the other sensor readings then it is difficult to partition the data set quickly, accurately and efficiently. In order to achieve this exactly the entire data set must be gone through which is not practical for large scale data sets and/or where the data is a continuous data stream.

Some previous approaches to ranking items in a data set have been based on randomized hashing schemes. However, these types of scheme require prior knowledge of all the distinct items in the data set. This knowledge is used to construct the hash functions. For large scale data sets this knowledge is typically not available or practical to obtain.

Other approaches have used random sampling techniques and there is a desire to improve such techniques.

The embodiments described herein are not limited to implementations which solve any or all of the disadvantages of known ranking systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Ranking systems are described. In an embodiment a large scale data center has peta bytes of items and a query engine is provided to find the top k most frequently occurring items. In embodiments, samples are taken from the data center at least until a specified number of samplings is met, or until a stopping rule is met. In examples, the samples form a sample sketch which is used to find the top k most frequently occurring items without the need to examine every item in the data center. In other examples, the specified number of samplings or stopping rule is varied to provide ranks or frequencies. In other embodiments the ranking system operates on items having values to find separators which divide the items into bins such that the proportion of the items in each bin is different. For example, a data set may be apportioned to different types of processor.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a ranking system for ranking sensor data, document keywords, or communications network data, the system described is provided as an example and not a limitation. As those skilled in the art will appreciate, the present examples are suitable for application in a variety of different types of ranking systems.

Figure 1:
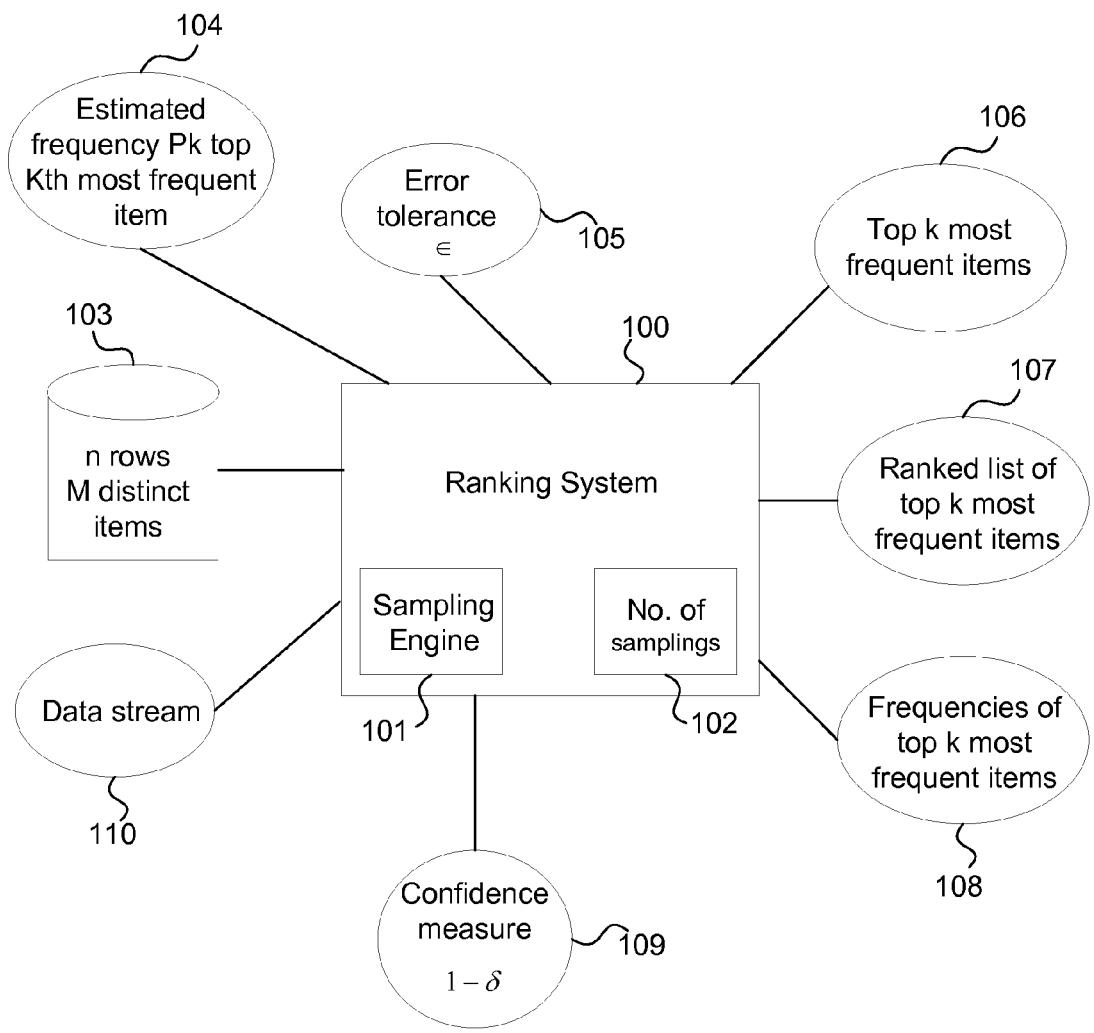
FIG. 1 is a schematic diagram of a ranking system.

FIG. 1 is a schematic diagram of a ranking system 100 implemented using a computer and comprising a sampling engine 101 and having a memory storing at least one number of samplings function 102. The ranking system receives data to be ranked from a data source. For example, the data source may be a database 103 having n rows of m distinct items. The data source may also be a data stream 110. The data source may be a large scale data center having on the order of peta bytes of items and the ranking system may provide a query engine for querying the data center.

The ranking system receives an error tolerance parameter value 105 as input. This parameter is represented by symbol E herein and it may either be set to a default value or may be received as an input by the ranking system 100. The error tolerance parameter $\epsilon$ is assumed to be small. For example, a suitable value of this parameter is 0.01 or 0.1. The ranking system also optionally receives a confidence measure 109 which is represented by symbol $1-\delta$. The symbol $\delta$ is used to refer to a prescribed upper bound on the probability of error. The confidence measure may be set to a default value or may be received as input by the ranking system. A suitable value of the confidence measure is 0.0001 or 0.001 for example.

The ranking system 100 also receives as input an estimate 104 of the frequency of occurrence in the set of data to be ranked of the top kth most frequent item. This frequency is represented herein by the symbol $p_k$. The ranking system is arranged to produce a "hot list" 106 of the top k most frequently occurring items in the set of data.

In some embodiments the ranking system 100 outputs the hotlist 106 simply as a set of top k most frequent items. In other embodiments this list is ordered and this is shown in FIG. 1 as 107. In other embodiments the frequencies of the top k most frequent items are also provided as output 108.

Figure 2:
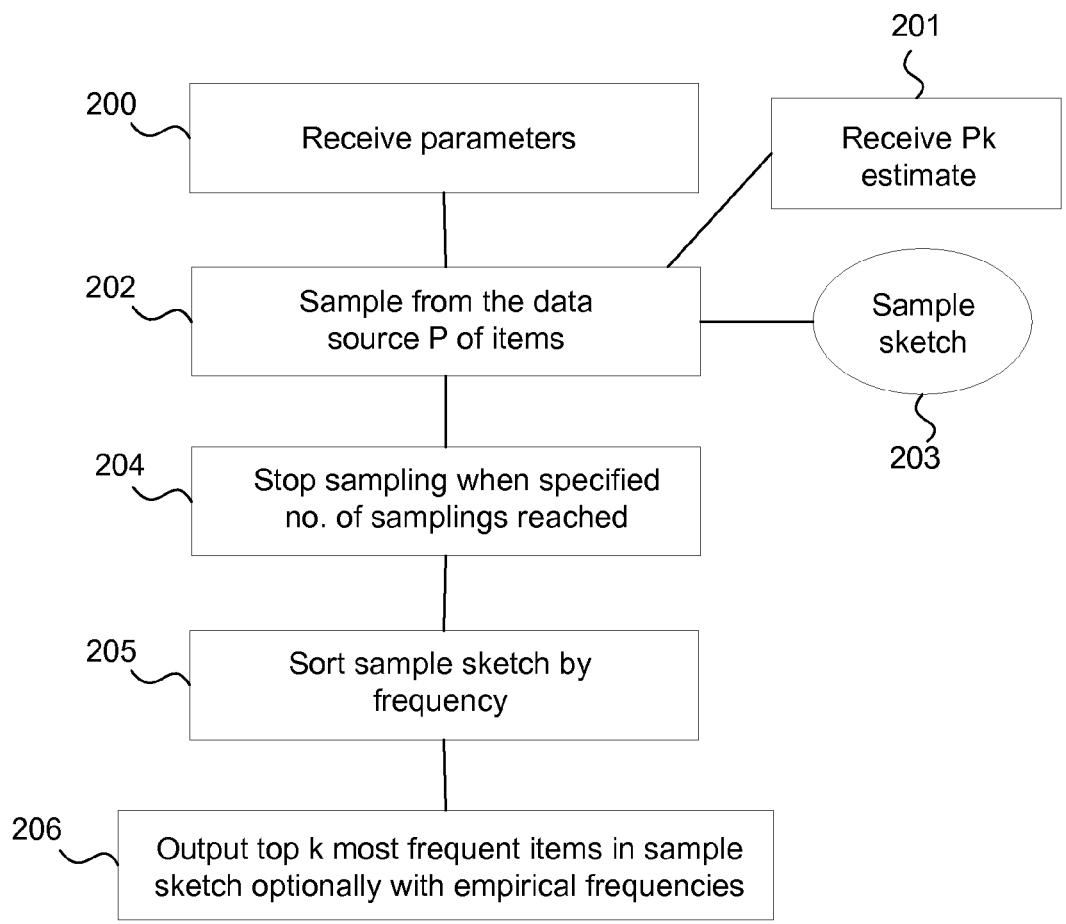
FIG. 2 is a flow diagram of a method at a ranking system.

FIG. 2 is a flow diagram of a method at the ranking system of FIG. 1. The error tolerance and confidence measure values are received 200 in cases where these are not set as default values. An estimate of $p_k$ is also received 201. These values are input to an appropriate one of the number of samplings functions 102 held in data structures at the ranking system to give a number of samplings value.

Samples are then taken from the data source P of items and added to a sample sketch 203. In some embodiments the samples are drawn at random using a pseudo random process of any suitable type. In other embodiments items may be sampled in consecutive blocks for efficiency reasons as described in Surajit Chaudhuri et al. "Random sampling for histogram construction: how much is enough?" In Proc. Of ACM SIGMOD, volume 27, pages 436-447, June 1998 which is incorporated herein by reference in its entirety. In some embodiments samples are drawn with replacement although this is not essential. The embodiments described herein also give workable solutions where sampling without replacement is used. Sampling with replacement comprises selecting an item from a set of data and noting that item (or saving a copy of it) without removing that item from the data set. The sample sketch is constructed and maintained in any suitable manner such as described in Gibbons et al "New sampling-based summary statistics for improving approximate query answers" In Proc. Of ACM SIGMOD 98, pages 331-342, 1998 and Vitter "Random sampling with a reservoir" ACM Trans. On Mathematical Software, 11(1):37-57, March 1985 both of which are incorporated herein by reference in their entirety.

Sampling ends 204 at least when the number of samplings value is reached; that is, when the cost of storing the sample sketch is met. The sample sketch is then sorted 205 by frequency of occurrence of each item in the sample sketch. The ranking system outputs 206 the top k most frequent items in the sample sketch optionally with the empirical frequencies from the sample sketch. It is found that for practical purposes, the top k most frequent items in the sample sketch are good estimates of the top k most frequent items in the whole data source. Different number of samplings functions are used depending on the output 106, 107, 108 required from the ranking system. Using a particular number of samplings function enables the sample sketch to be tailored to give good results for a particular type of output. The method enables a tradeoff to be made between the size of the randomly sampled sketch and the probability of error. The method is achievable without the need to know or estimate the number m of distinct items in the data source. For example, if the data source is a list of people's names where some people may have the same name, then the number m is the number of unique names rather than the total number of entries in the list. In large scale applications the total number of distinct items m may itself be an unknown parameter that is prohibitively expensive to estimate. The ranking system of FIG. 1 takes as input a parameter which is specific to the underlying top-k ranking problem which is the kth most frequent item frequency in this example. This parameter is typically less expensive to estimate than the parameter m for many applications. By using a parameter which is specific to the underlying top-k ranking problem the size of the sample sketch is reduced as compared with using the parameter m.

A detailed example of a method of ranking items is now given in which the error tolerance parameter $\epsilon$ represents an absolute measure. In this example the threshold for frequencies of false items is $p_k - \epsilon$. A false item may be for example, an item which is empirically one of the top-most frequently occurring items but is not identified as being so. It may also be a member of the "hot list" which should not really be in that hot list. Alternatively, E can be defined to be a relative measure by defining the threshold as $(1-\epsilon)p_k$.

Consider a set of items $X=x_1, \ldots, x_n$ where each $x_i \in \chi$. Define m as the total number of distinct items, i.e. $m=|\chi|$, and number the items of $\chi$ as $1, 2, \ldots, m$. Let $n_i$ denote the number of occurrences of item i in the set X so that $n=\Sigma_i n_i$. Define the distribution P on the alphabet $\chi$ as $p_i = n_i/n$ for all i. The items are labeled so that $$p_1 \geq p_2 \geq \ldots \geq p_m.$$

Let $\tau$ contain k items with frequencies greater or equal to $p_k$ and B contain the items with frequencies less than or equal tp $p_k - \epsilon$. Let t denote the number of samplings with replacement from the dataset. Let $q_i$ denote the empirical frequency of item i in the random sketch and Q the distribution corresponding to $\{q_i\}_1^m$. The sampled sketch is sorted in decreasing order of frequencies and the top k most frequently occurring items in the sketch are reported as the top k set. In the case that their frequencies are also required, the empirical frequencies $q_{(\cdot)}$'s are reported along with the top k elements where $\{q_{(i)}\}_1^m$ is the sequence of empirical frequencies sorted in decreasing order.

In some embodiments the input to the ranking system comprises a specified number of samplings. In this case the system returns a ranking result and a confidence measure indicating the confidence in the ranking result. The confidence may be 1—the probability of error where upper bounds on the probability of error are specified. For example, as described in "Ranking through random sampling" MSR-TR-2009-8 Jan. 2009 which is incorporated herein by reference in its entirety.

In other embodiments an input to the ranking system comprises a confidence measure $1-\delta$ and the system returns the ranking result and the number of required samplings so that the confidence is greater or equal to $1-\delta$.

In the case that the output required is a "hot list" 106 of the top k most frequent items the number of samplings function is given as:

$$\frac{4p_k}{\epsilon^2}\left(\log\frac{1}{\delta} + \log(kK)\right)$$

In the case that the output required is a ranked hot list 107 of the top k most frequent items then the number of samplings function is given as:

$$\frac{4p_1}{\epsilon^2}\left(\log\frac{1}{\delta} + \log(kL)\right)$$

In the case that the output required is a ranked hot list 108 with frequencies of the k most frequent items then the number of samplings function is given as:

$$\frac{8p_1(1-p_1)}{\epsilon^2}\left(\log\frac{1}{\delta} + \log(2M)\right)$$

These number of samplings functions are provided up to a multiplicative constant $(1+O(\epsilon))$ and the following notation is used:

$$K = \min[2/(p_k - \epsilon), m - k], \; K' = \min[2/[1 - \epsilon)p_k], m = k],$$

$$L = \min\left[\frac{2}{p_k - \epsilon} + k, m\right], \; L' = \min\left[\frac{2}{(1-\epsilon)p_k} + k, m\right],$$

$$M = \min[2/(p_k - \epsilon) + 1, m], \text{ and}$$

$$M' = \min[2/(1-\epsilon)p_k] + 1, m].$$

In other embodiments, the error tolerance parameter $\epsilon$ provides a relative measure rather than being an absolute value. In this case the following number of samplings functions may be used:

For the top k most frequent items:

$$\frac{4}{p_k \epsilon^2}\left(\log\frac{1}{\delta} + \log(kK')\right)$$

For the ranked hot list of top k most frequent items:

$$\frac{4}{p_1 \epsilon^2}\left(\log\frac{1}{\delta} + \log(kL')\right)$$

For the hot list of top k most frequent items with frequencies:

$$\frac{16\left(1 - \frac{p_k}{2}\right)}{p_k \epsilon^2}\left(\log\frac{1}{\delta} + \log(2M')\right)$$

In the embodiments described above with reference to FIGS. 1 and 2 the ranking system takes as input an estimate of $p_k$. Other embodiments in which this input is not required are now described. These use online sequential processes.

Figure 3:
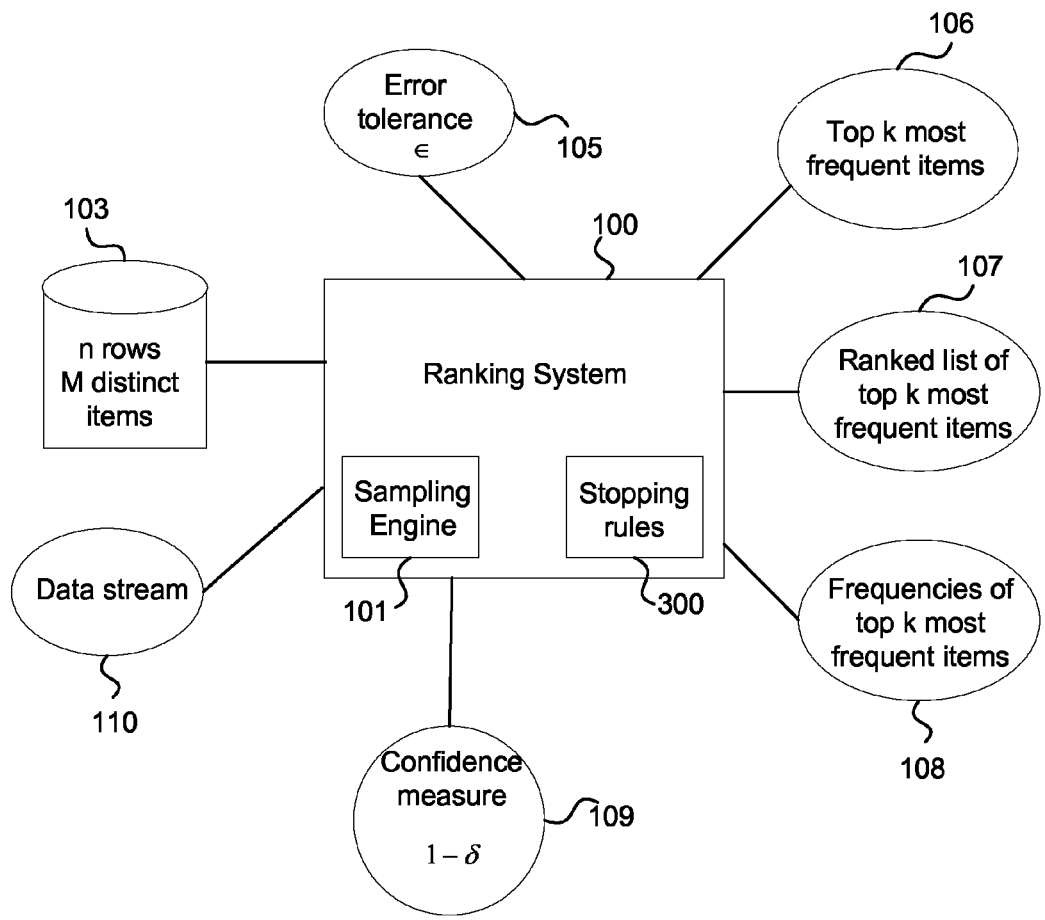
FIG. 3 is a schematic diagram of another ranking system.

FIG. 3 is a schematic diagram of a ranking system 100 which is similar to that of FIG. 1. However, there is no input providing an estimate of $p_k$ and the number of samplings is replaced by stopping rules 300. The error tolerance parameter 105 and the confidence measure 109 are equivalent to those of FIG. 1 and the value of the error tolerance parameter 105 is again taken to be small. Suitable values of the error tolerance parameter 105 areas given above. The data source 103, 110 may be a large scale data center having on the order of peta bytes of items and the ranking system may provide a query engine for querying the data center.

A method of ranking items using the apparatus of FIG. 3 is described with reference to FIG. 4. Values of an error tolerance parameter and a confidence measure are accessed. For example, these may be inputs to the method or may be default, preconfigured values. These parameter values are input to an appropriate stopping rule according to the type of output 106, 107, 108 required.

Counters are then initialized 401. These include sample counter T and observed empirical frequency counters Q. A sampling process 402 then begins sampling from a data source P of items. The samples obtained are used to create a sample sketch 403. The methods of sampling and the methods of creating the sample sketch may be the same as described for the earlier embodiments.

Each time a sample is taken the counters are incremented appropriately 404 and the sampling process stops when the stopping rule is met 405. The sample sketch is then sorted by frequency 406 and used to output the top k most frequent items 407. Different stopping rules are used for different ones of the outputs 106, 107, 108 as described below.

Figure 4:
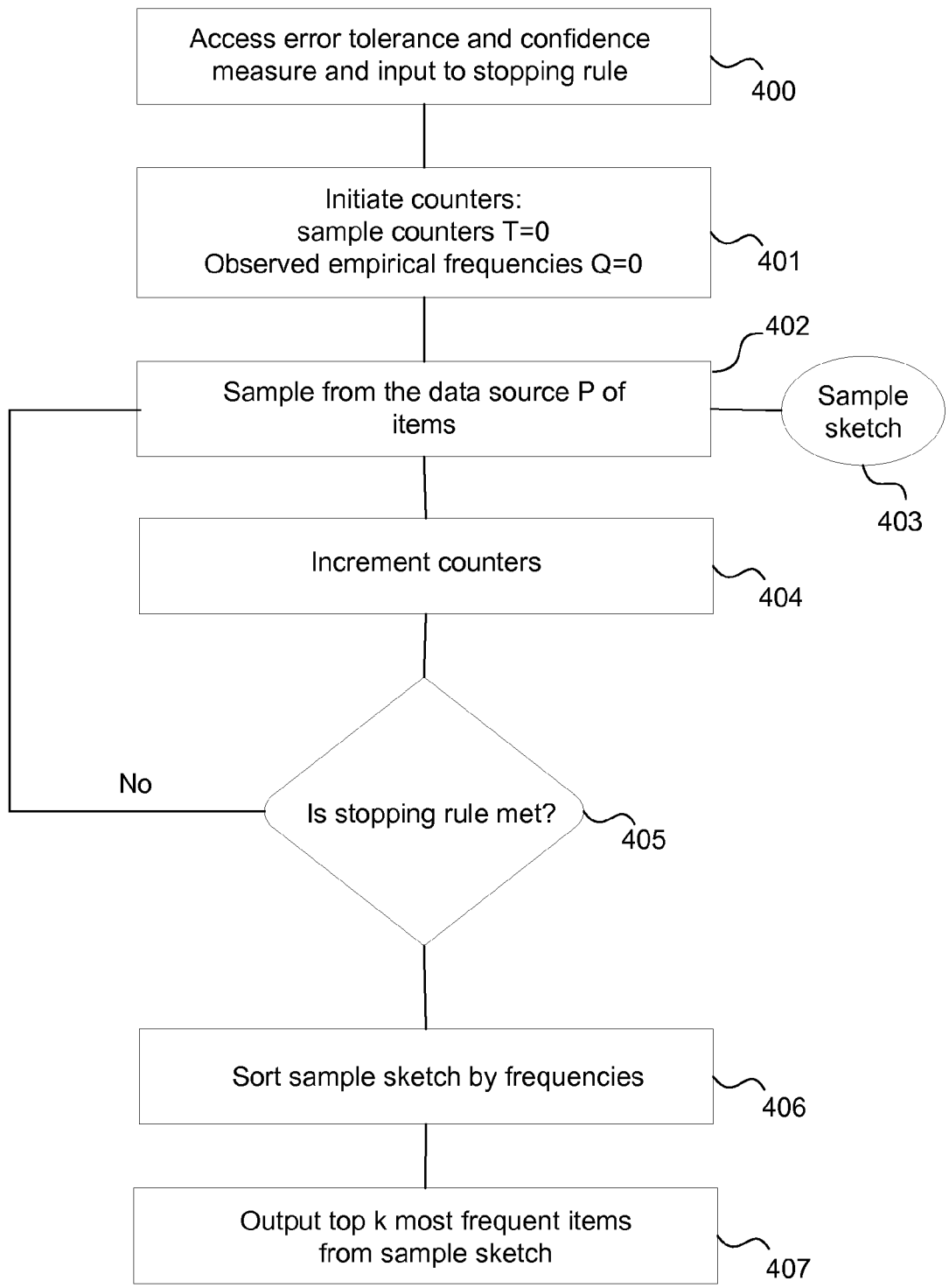
FIG. 4 is a is a flow diagram of a method at the ranking system of FIG. 3.

In the process of FIG. 4 the output may provide an $\epsilon$-approximation to the top k set. Let Q be an observed empirical frequency and the items be numbered so $q_1 \geq q_2 \ldots \geq q_m$.

Let $S(Q)$ be the set of items in the set $\{j : q_j \geq q_k\}$ and let $B(Q) = \{j : q_j \geq q_k - \epsilon\}$. Let $l(k) := \min\{j : q_j \leq q_k - \epsilon\}$. Let $z_\delta$ be defined by $1 - \Phi(z_\delta) = \delta$ where $\Phi(\cdot)$ is cumulative distribution function of a normal random variable and let $\Delta(Q) := \delta/(|S(Q)||B(Q)|)$. In place of $z_\delta^2$ we can use $2\log(1/\delta)$. This follows from the fact $1 - \Phi(x) \leq e^{-x^2/2}/(\sqrt{2\pi}x), x > 0$.

In the case that the output required is a hot list of the top k most frequently occurring items then the stopping rule may be as described below:

---
Sequential Sampling for Top-K Set

Input: $\delta, \epsilon$
Init: Q = 0, T = 1
while 1
    sample an item from P
    Update Q If $T > \frac{q_k + q_{l(k)}}{(q_k - q_{l(k)})^2} z_\Delta^2(Q)$ break
    T = T + 1
Output: Top k most frequent items with respect to Q.

---

In the case that the output required is a ranked hot list of the top k most frequently occurring items then the stopping rule may be as described below:

$$T > \max_{i \leq k} \frac{q_i + q_{l(i)}}{q_i - q_{l(i)}} z_\Delta^2(Q)$$

where $l(i) = \min\{: p_j \leq p_i\}$

In the case that the output required is a hot list of the top k most frequently occurring items with frequencies then the stopping rule may be as described below:

```
                     Top-K Set with Frequencies

Input: δ, ε
    Init: Q = 0, T = 1
    while 1
        sample an item from P
        Update Q If T > (max_i q_i(1 - q_i) / ε²) z²_Δ(Q)

break
        T = T + 1
    Output: Top k most frequent items with respect to Q.
```

Figure 5:
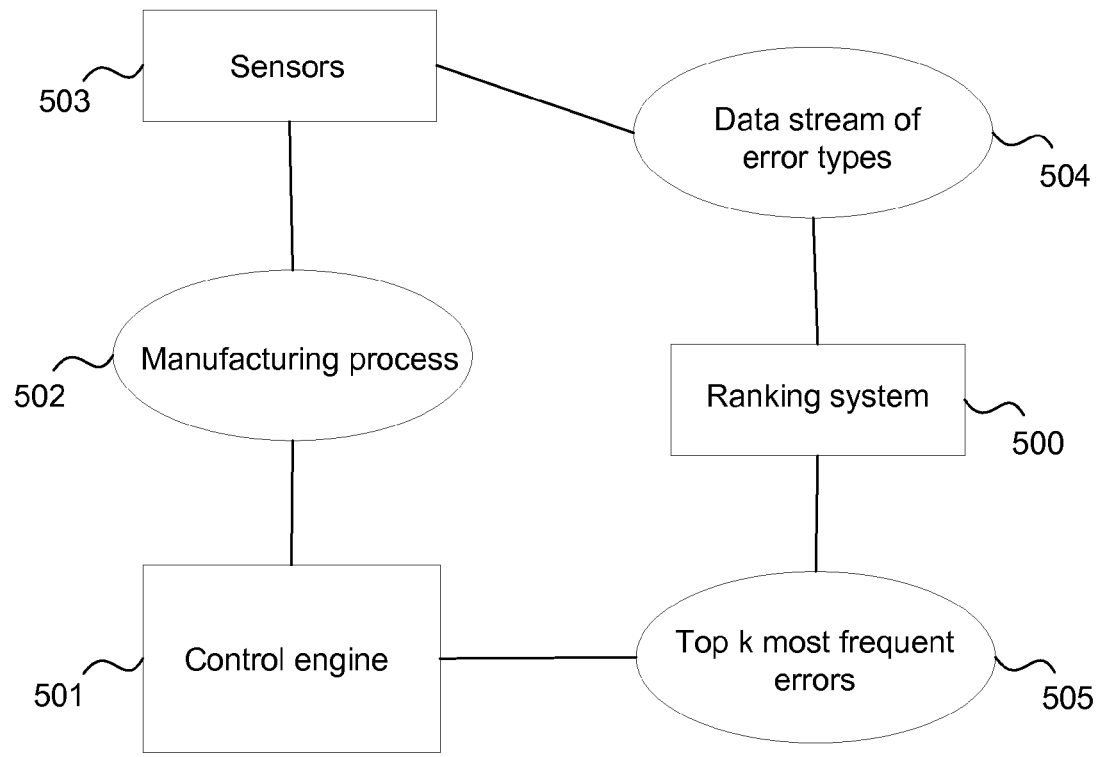
FIG. 5 is a schematic diagram of a control system for a manufacturing plant.

The ranking systems described thus far herein may be integral with a manufacturing control system as illustrated in FIG. 5. A manufacturing process 502 is controlled by a control engine 501 which is itself in communication with a ranking system 500 such as that of FIG. 1 or FIG. 3. Sensors 503 are provided which monitor the manufacturing process and provide a data stream 504 of error types or other categorized data. For example, the sensors may detect different types of errors in products produced by the manufacturing process 502. The ranking system 500 is arranged to provide a "hot list" of error types 505 and this is provided as feedback information to the control engine 501. The control engine is arranged to use the feedback information to modify the manufacturing process on the basis of preconfigured rules, thresholds and/or other criteria. Because the data stream of error types 504 is continually output by the manufacturing process the ranking systems described herein are particularly suitable. By providing the top k error types to the control engine 501 quickly, simply and accurately the manufacturing process can be adjusted to reduce waste, reduce costs and improve productivity.

Figure 6:
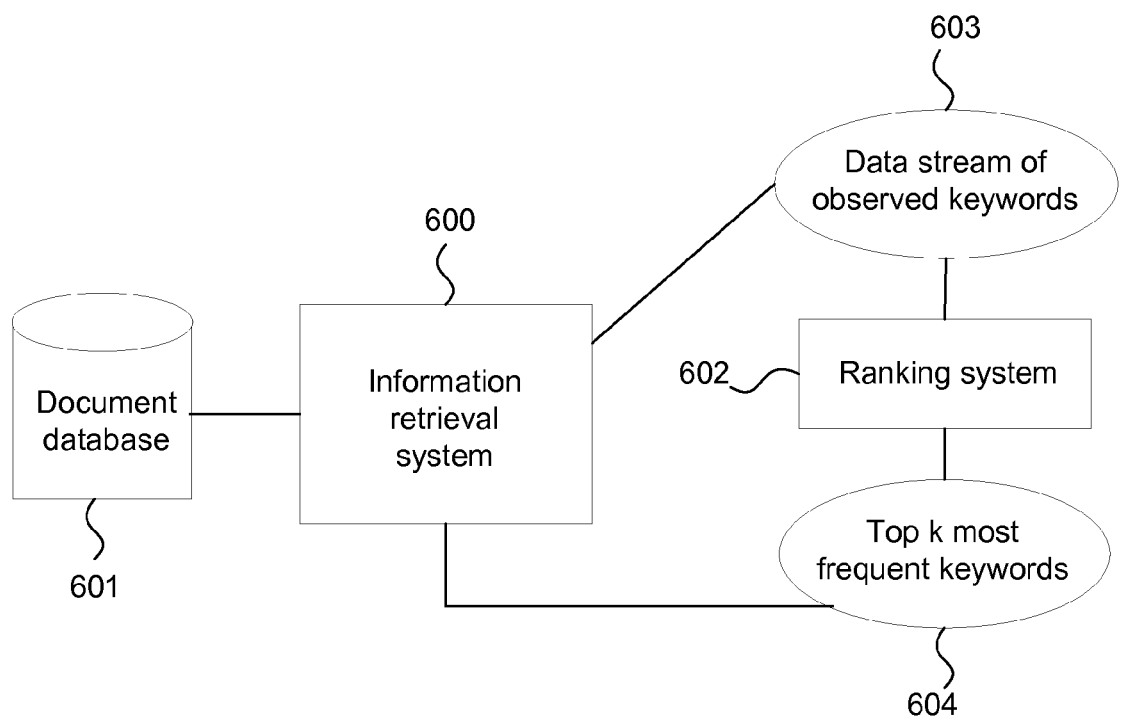
FIG. 6 is a schematic diagram of an information retrieval system.
Figure 7:
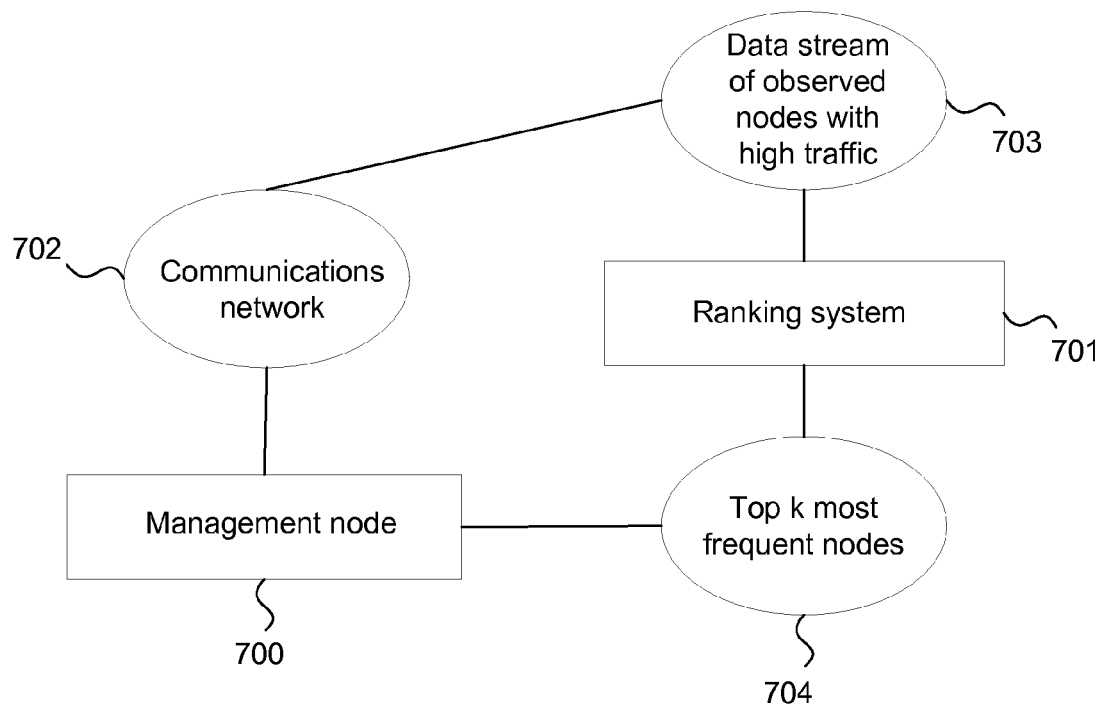
FIG. 7 is a schematic diagram of a communications network management system.

The ranking systems described above may be part of an information retrieval system. Information retrieval systems are often required to operate for web-scale applications where the amounts of data involved are huge and the ranking systems described herein are particularly suited to this type of application. Consider a document database 601 which is accessed by a information retrieval system 600 as shown in FIG. 6. Users enter keywords to a search engine provided by the information retrieval system 600 to retrieve documents from the document database 601 in any suitable manner. A data stream of observed keywords 603 is thus obtained and input to a ranking system 602 such as that of FIG. 1 or 3. The ranking system 602 provides a list of the top k most frequent keywords 604 (which may be ranked and which may also comprise the frequencies of those keywords) and this given as feedback to the information retrieval system 600. The information retrieval system is then able to use that information to influence operation of the information retrieval system 600.

In another example a communications network 702 is managed by a management node 700. The management node may be arranged to observe traffic in the communications network and to monitor traffic rates at different nodes in the network. A data stream 703 of node identities where those nodes have a traffic rate higher than a specified level may be provided. The number of nodes in the communications network may be extremely high and a ranking system 701 is provided to quickly identify the top k most frequently occurring nodes in the data stream. That information may then be fed back to the management node 700 and used to influence management of the communications network 702. The ranking system may be of any suitable type described herein.

In other embodiments the data source comprises items having associated values. For example, the items may be sensor readings, prices, or other items having values. It is often required to partition the data from this type of data source by the magnitude of the values and so that a specified proportion of the items is present in each portion. For example, it may be required to give 10% of the items to a fine scale processor and 90% of the items to a coarse scale processor and where the items given to the fine scale processor should be those with the lowest values. This problem effectively involves finding the distribution of values across all the items. To do this exactly entails going through the entire dataset which is often practically infeasible. Dividing the items into portions according to the values of the items can be thought of as forming a histogram. In the examples described herein the bins of the histogram may be of different widths.

Figure 9:
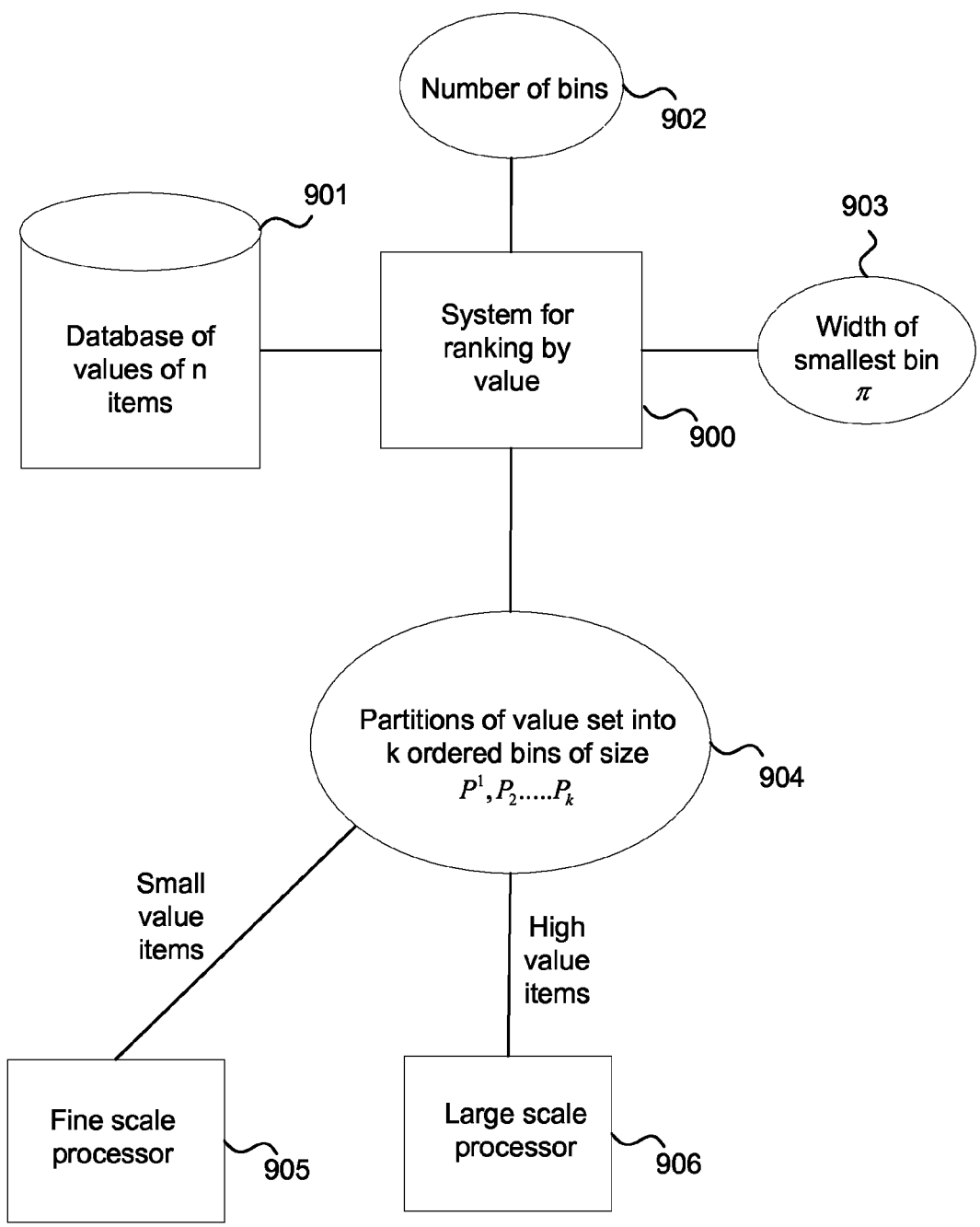
FIG. 9 is a schematic diagram of a distributed processing system.

As illustrated in FIG. 9 a system for ranking by value may be provided. This is arranged to receive data from a source such as a database 901 of values of n items (or a data stream of values). The ranking system 900 also takes as input a required number of bins k into which the values are to be partitioned. For example, in the 90%, 10% example above there are only two bins. However, there could be many more bins. It is also possible for the required number of bins to be set to a default value. Another input received by the ranking system 900 is the width of the smallest bin 903 represented by symbol π herein. The ranking system 900 provides output which comprises partitions of the values into k ordered bins of size p1, p2, . . . pk. In the case that there are two bins the small valued items may then be directed to a fine scale processor 905 and the high valued items to a large scale processor 906. Once the partitions are known the values from the data source may be used by any suitable processes on the basis of those partitions.

Figure 10:
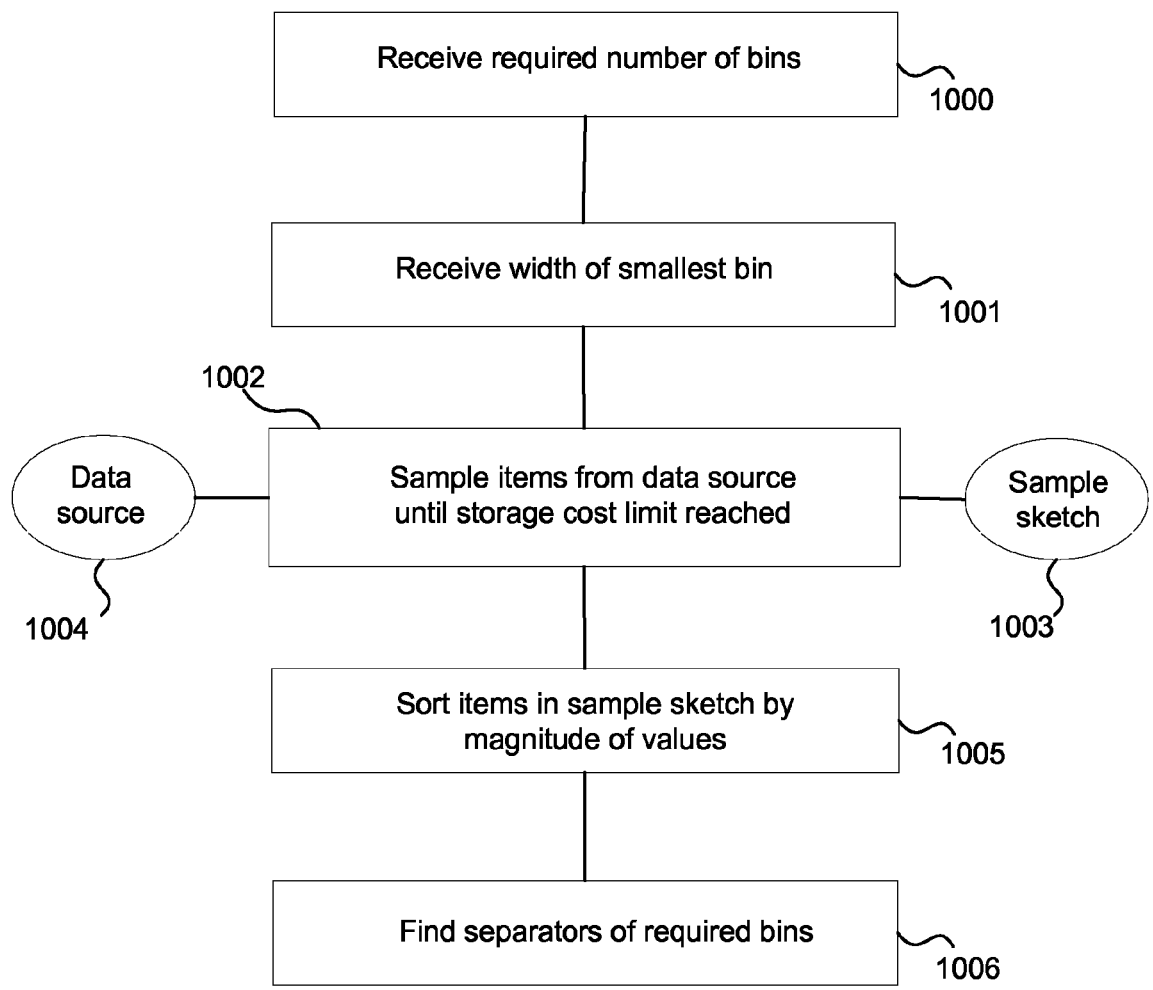
FIG. 10 is a flow diagram of a method at a ranking system for ranking by value.
Figure 11:
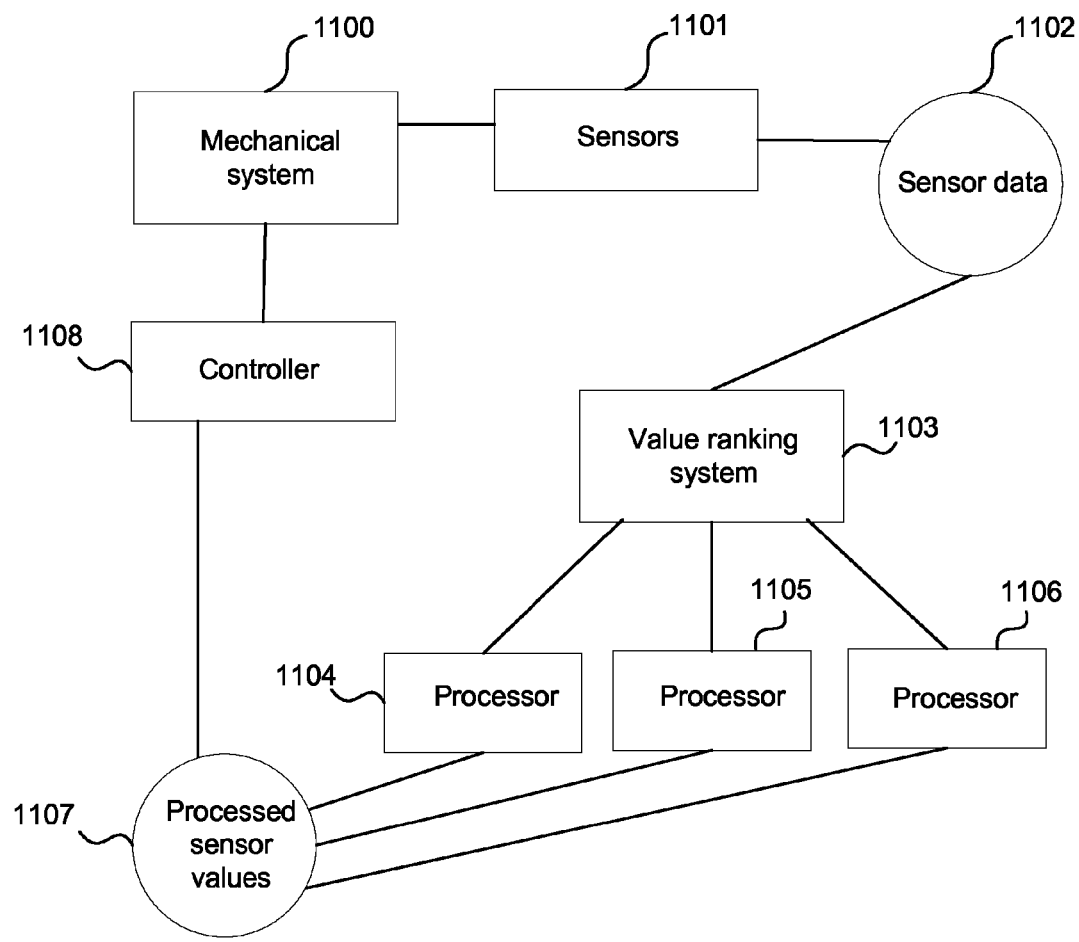
FIG. 11 is a flow diagram of a system for controlling a mechanical system.

As described with reference to FIG. 10 a required number of bins k is received 1000 at a ranking system and also information about the required width of the smallest bin 1001. That information is input to a data structure at the ranking system holding a storage function and a number of samplings is thus obtained. Items are sampled 1002 from the data source 1004 using any suitable sampling method as described above and to create a sample sketch 1003. Sampling ends when the number of samplings is reached. The items in the sample sketch are then sorted on the basis of their values 1005 and the sorted sample sketch is used to find 1006 the separators of the bins. These separators may then be applied to the data source itself 1004.

In an embodiment the number of samplings is given as:

$$\frac{2(1-\pi)}{\pi \epsilon^2}\left(\log\frac{1}{\delta} + 2\log n + \log k\right)$$

In a particular example

Figure 8:
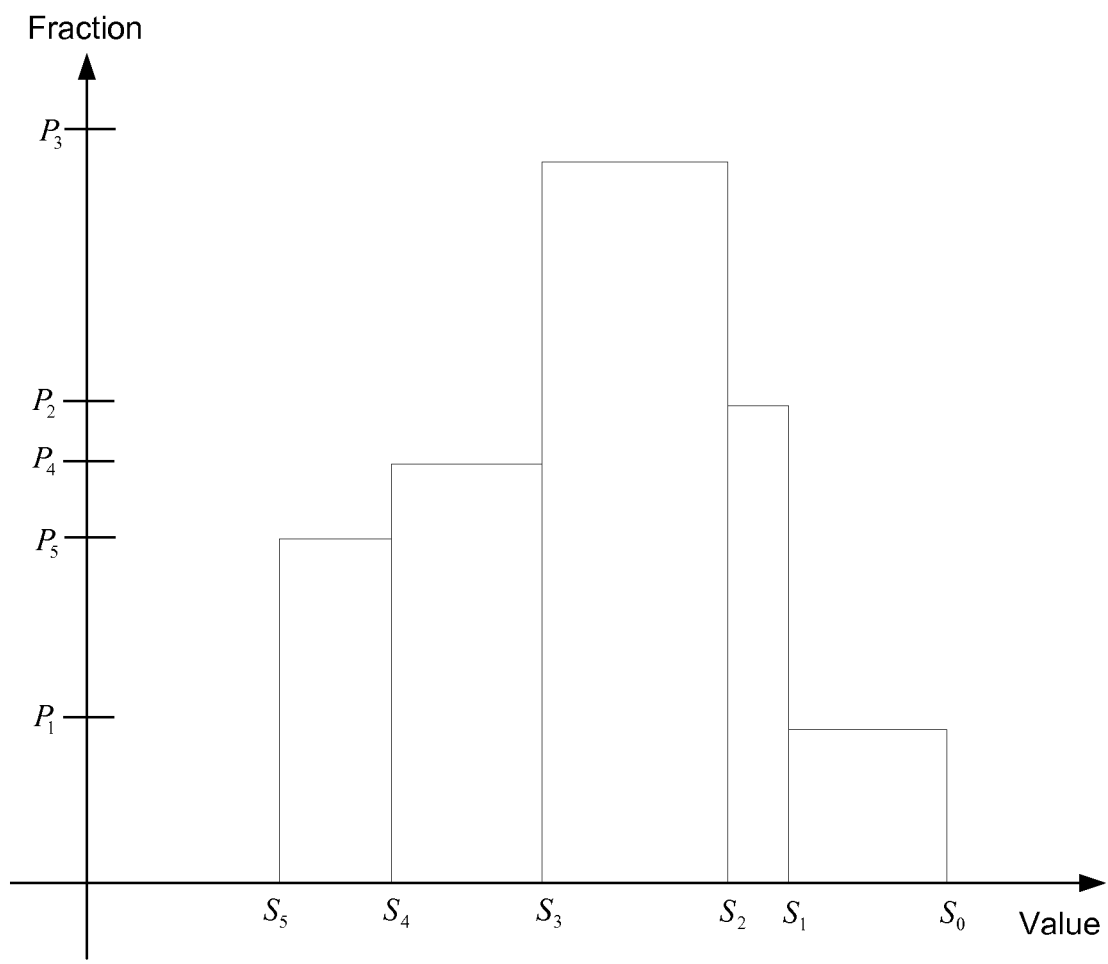
FIG. 8 is an example of a histogram estimated from a set of values.

Let set $X=\{x_1, x_2, \ldots, x_n\}$ be a set of values of n items 1, 2, . . . , n. The $x_i$'s take value in any ordered domain, i.e. $x_i \in R$. Without loss of generality let the items be numbered so that $x_1 \leq x_2 \leq \ldots \leq x_n$. Consider creating a range partitioning of the value set i.e. creating a histogram. To each histogram, associate a distribution P described by $\{p_i\}_1^k$ where $\Sigma_i p_i = 1$. The distribution P describes the width of every bucket in the histogram, i.e., the top portion of the histogram has size $p_1$, the next portion has size $p_2$ and so on. This is illustrated in FIG. 8.

Define separators $\{s_i\}_0^k$ as follows, $S_0 = x_n, S_k = x_1$ and the remaining $S_i$'s are defined such that $$\frac{1}{n} |\{j: s_{i-1} \geq x_j \geq s_i\}| = p_i.$$

In other words, the separators apportion the value set as P.

Consider estimating the P-histogram of the value set X from a sample of the value-set.

Suppose the size of the sample sketch is t, estimate the separators of the P-histogram in the following manner—sort the sketch by the value of items and identify $\hat{s}_i$ for $i=1, \ldots, k-1$ as the element which is of rank $\Sigma_{j=1}^{i} p_j$.

Define $\hat{s}_0 = x_n$ and $\hat{s}_k = x_1$. In other words, the estimated separators are the actual separators of the P-histogram of the sample sketch. The portions $q_i$'s induced by the separators $\hat{s}_i$'s on X are defined as $$q_i \stackrel{\Delta}{=} \frac{|\{j: \hat{s}_{i-1} \geq x_j \geq \hat{s}_i\}|}{n}.$$

Let Q be the distribution associated to $\{q_i\}_1^k$.

In an embodiment a mechanical system is controlled by a control system comprising a value ranking system such as that described herein. A mechanical system 1100 is monitored by sensors 1101 to produce a stream of sensor values 1102 which are provided to a value ranking system 1103. The value ranking system finds partitions to partition the values into three bins of different widths. For example, 10% of the values, 60% of the values and 30% of the values and where the smallest values are in the first bin and the highest values in the last bin. The partitions are used to direct the values to different ones of three processors 1104, 1105, 1106 which carry out different processing on the values and then provide their results as processed sensor values 1107 to a controller 1108. The controller 1108 uses those processes sensor values 1107 to influence control of the mechanical system.

In all the embodiments described herein the ranking systems enable the required outputs to be provided with a small number of samplings from the data set (for example, which is logarithmic in the size of the data set) and which are accurate up to a specified level of confidence (given by the confidence measure). The data sets may be enormous having tera or peta bytes of items.

Figure 12:
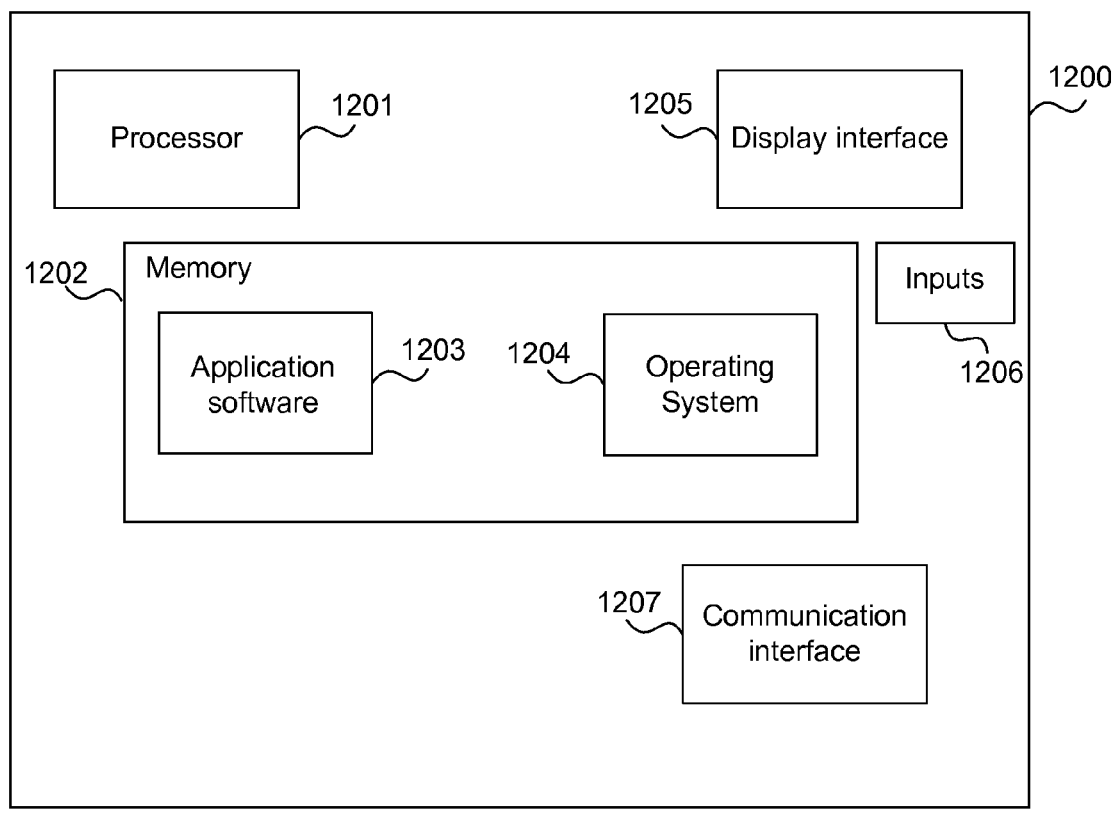
FIG. 12 illustrates an exemplary computing-based device in which embodiments of a clustering system may be implemented.

FIG. 12 illustrates various components of an exemplary computing-based device 1200 which may be implemented as any form of a computing and/or electronic device, and in which embodiments of a ranking system may be implemented.

The computing-based device 1200 comprises one or more inputs 1206 which are of any suitable type for receiving media content, Internet Protocol (IP) input, data streams of items of different categories, data streams of values, input from databases of items and input from sources of values. The device also comprises communication interface 1207 to enable communication with other entities over a communications network of any suitable type.

Computing-based device 1200 also comprises one or more processors 1201 which may be microprocessors, controllers or any other suitable type of processors for processing computing executable instructions to control the operation of the device in order to rank items. Platform software comprising an operating system 1204 or any other suitable platform software may be provided at the computing-based device to enable application software 1203 to be executed on the device.

The computer executable instructions may be provided using any computer-readable media, such as memory 1202. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. A display interface 1205 may provide a graphical user interface, or other user interface of any suitable type although this is not essential.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of identifying a top k most frequently occurring items in a data set, the method comprising:
   arranging a processor to access a value of a confidence measure and a value of an error tolerance parameter;
   arranging the processor to sample items from the data set at least as many times as prescribed by a function of the confidence measure, the error tolerance parameter and other parameters which exclude a parameter m being a number of distinct items in the data set, and to continue sampling items until a stopping rule is met, the stopping rule being based in part on a posterior probability of error conditional on an observed empirical frequency of items in the data set;
   arranging a memory to form a sample sketch from the sampled items; and
   arranging the processor to identify the top k items from the sample sketch;
   wherein the stopping rule is selected from one of:
      stopping sampling when a sample counter exceeds the maximum value of the sum of an empirical frequency of a k-th largest frequency item in a sample set and a largest frequency that is smaller than a threshold or relative threshold for frequencies of false items, divided by the empirical frequency of the k-th largest frequency item in the sample set minus the largest frequency that is smaller than the threshold or relative threshold for frequencies of false items, multiplied by a $\Delta$ quantile of a normal distribution; and
      stopping sampling when a sample counter exceeds a sum of an empirical frequency of a k-th largest frequency item in a sample set and a largest frequency that is smaller than a threshold or relative threshold for frequencies of false items, divided by the empirical frequency of the k-th largest frequency item in the sample set minus the largest frequency that is smaller than the threshold or relative threshold for frequencies of false items squared, and multiplied by a $\Delta$ quantile of a normal distribution.

2. A method as claimed in claim 1 which also provides the frequencies of the top k most frequently occurring items in the data set and wherein the processor is arranged to identify the top k most frequently occurring items in the sample sketch and the frequencies of occurrence of those items in the sample sketch.

3. A method as claimed in claim 1 wherein the processor is arranged to access an absolute value of the error tolerance parameter.

4. A method as claimed in claim 1 wherein the processor is arranged to access a relative value of the error tolerance parameter.

5. A method as claimed in claim 1 wherein the items are sensor readings of error types in a manufacturing process and wherein the top k most frequent error types are identified and provided to a control system arranged to control the manufacturing process.

6. A method as claimed in claim 1 wherein the items are keywords observed at an information retrieval system and wherein the top k most frequently occurring keywords are identified and provided to the information retrieval system as feedback.

7. A method as claimed in claim 1 wherein the items are nodes in a communications network and wherein the top k most frequently occurring nodes are identified and provided as input to a management node of the communications network.

8. A method as claimed in claim 1 wherein the data set comprises peta bytes of items.

9. A query engine arranged to query a data center storing on an order of peta bytes of items in a data set, to find a top k most frequently occurring items in the data center, the query engine comprising:
   a processor arranged to access a value of a confidence measure, a value of an error tolerance parameter, and an estimate of a frequency of the top kth most frequent item in the data set;
   the processor also being arranged to continue sampling items from the data set at least as many times as prescribed by a function of the confidence measure, the error tolerance parameter, the estimate of the frequency of the top kth most frequent item in the data set, and excluding a parameter m being a number of unique items in the data set, the number of unique items being different than a total number of items in the data set;
   a memory arranged to store a sample sketch comprising the sampled items; and
   the processor also being arranged to identify the top k most frequently occurring items in the sample sketch;
   wherein the function of the confidence measure is selected from:
      four times an estimate of the frequency of the top kth most frequent item in the data set divided by an error tolerance parameter squared, multiplied by, a logarithm of 1 over a prescribed upper bound on a probability of error and a logarithm of k items with frequencies greater than or equal to the estimate of the frequency of the top kth most frequent item multiplied by the smaller of: two divided by, the estimate of the frequency of the top kth most frequent item in the data set minus the error tolerance parameter; and the number of items in the data set minus k;
      four times an estimate of the top kth most frequent item in the data set divided by an error tolerance parameter squared multiplied by the sum of a logarithm of 1 over a prescribed upper bound on a probability of error and a logarithm of k items greater than or equal to the estimate of the top kth most frequent item multiplied by the smaller of two divided by, the estimate of the frequency of the top kth most frequent item in the data set minus the error tolerance parameter, plus the estimate of the frequency of the top kth most frequent item in the data set; and the number of items in the data set; and
      eight times an estimate of the frequency of the top most frequent item in the data set multiplied by 1 minus the estimate of the frequency of the top most frequent item in the data set, divided by an error parameter squared and multiplied by a logarithm of 1 over a prescribed upper bound on a probability of error and a logarithm of two times M where M is the smaller of two divided by, the estimate of the frequency of the top kth most frequent item in the data set minus the error tolerance parameter, plus 1; and the number of items in the data set.

10. A ranking system comprising:
an input arranged to access a data set comprising items having values;
a memory arranged to store a required number of bins into which the values are to be partitioned;
a processor arranged to find separator values for allocating the items into the bins in order that a specified proportion of the items is allocated to each bin, that specified proportion being different for at least two bins;
the processor being arranged to sample items from the data set at least until a specified function is met, that function being of a confidence measure, an error tolerance parameter, and a width of the smallest bin;
a memory arranged to store a sample sketch comprising the sampled items; and
wherein the processor is also arranged to find the separator values from the sample sketch;
wherein the function of the confidence measure is selected from:
four times an estimate of the frequency of the top kth most frequent item in the data set divided by an error tolerance parameter squared, multiplied by, a logarithm of 1 over a prescribed upper bound on a probability of error and a logarithm of k items with frequencies greater than or equal to the estimate of the frequency of the top kth most frequent item multiplied by the smaller of: two divided by, the estimate of the frequency of the top kth most frequent item in the data set minus the error tolerance parameter; and the number of items in the data set minus k;
four times an estimate of the top kth most frequent item in the data set divided by an error tolerance parameter squared multiplied by the sum of a logarithm of 1 over a prescribed upper bound on a probability of error and a logarithm of k items greater than or equal to the estimate of the top kth most frequent item multiplied by the smaller of two divided by, the estimate of the frequency of the top kth most frequent item in the data set minus the error tolerance parameter, plus the estimate of the frequency of the top kth most frequent item in the data set; and the number of items in the data set; and
eight times an estimate of the frequency of the top most frequent item in the data set multiplied by 1 minus the estimate of the frequency of the top most frequent item in the data set, divided by an error parameter squared and multiplied by a logarithm of 1 over a prescribed upper bound on a probability of error and a logarithm of two times M where M is the smaller of two divided by, the estimate of the frequency of the top kth most frequent item in the data set minus the error tolerance parameter, plus 1; and the number of items in the data set.

11. A ranking system as claimed in claim 10 which further comprises a plurality of second processors and an output arranged to output items from the data set to the second processors on the basis of the separator values.

12. A ranking system as claimed in claim 10 which is arranged to operate where the data set is comprises on the order of peta bytes of items.

13. A ranking system as claimed in claim 11 wherein the second processors are connected to the ranking system over a communications network.

14. A ranking system as claimed in claim 11 wherein the second processors are arranged to each process values at different scales.

15. A ranking system as claimed in claim 10 wherein the values are sensor readings sensed from a mechanical system to be controlled.

* * * * *